June 8, 1937. L. L. RECTOR 2,083,091
JOINT SEAL
Filed Jan. 25, 1937 2 Sheets-Sheet 1
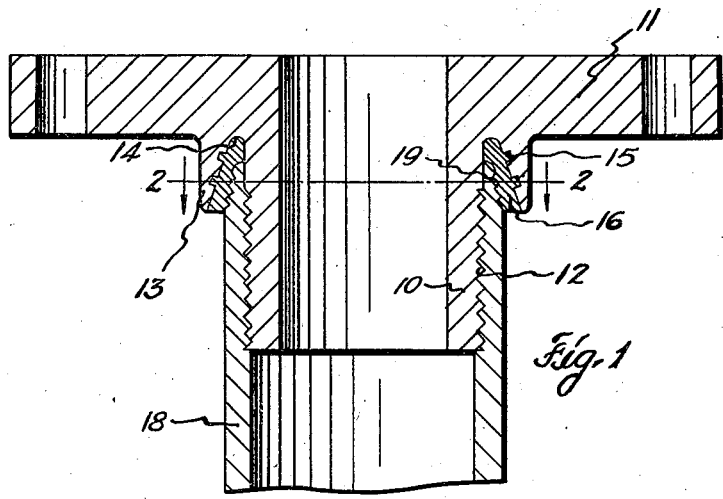
Fig. 1
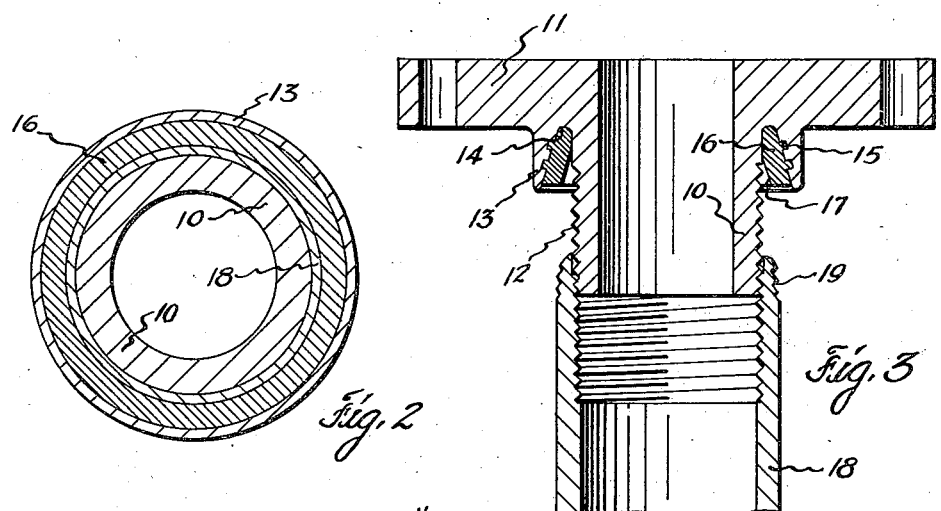
Fig. 2
Fig. 3
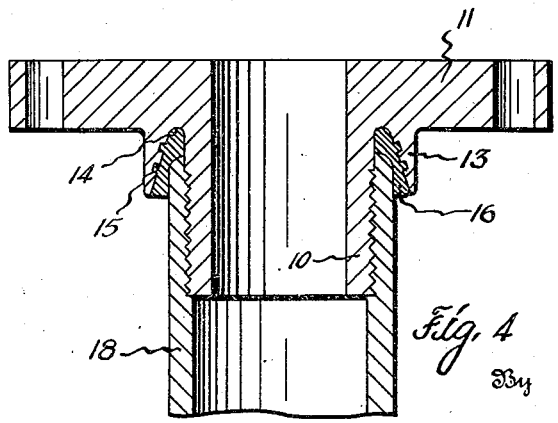
Fig. 4
Inventor
LAURENCE L. RECTOR
By
Attorney June 8, 1937. L. L. RECTOR 2,083,091
JOINT SEAL
Filed Jan. 25, 1937 2 Sheets-Sheet 2

Inventor
LAURENCE L. RECTOR

By Jack A. Shly
Attorney

Patented June 8, 1937

2,083,091

UNITED STATES PATENT OFFICE 2,083,091

JOINT SEAL

Laurence L. Rector, Fort Worth, Tex.

Application January 25, 1937, Serial No. 122,241

4 Claims. (Cl. 285—138)

This invention relates to new and useful improvements in joint seals.

One object of the invention is to provide an improved means for sealing the joint between telescoping members.

An important object of the invention is to provide an improved means for sealing the joint between members which are screw-threaded together, whereby leakage past the threads is prevented.

Another object of the invention is to provide an improved means for sealing the joint between telescoping members which includes a packing element surrounding one of the members and arranged to engage the end of the other member, whereby fluid leakage past the joint is prevented.

A further object of the invention is to provide an improved means for sealing a joint between members which are screw-threaded together wherein one member carries a distortable packing element which is arranged to be moved into sealing position when engaged by the other member in making up the threaded connection.

Still another object of the invention is to provide an improved joint seal of the character described wherein a recess is formed on one of the members for holding the packing material, said recess being so arranged that the packing material is engaged by the end of the other member when a connection is made, the end of said member extending into the recess whereby the recess acts as a brace to strengthen the joint.

A construction designed to carry out the invention will be hereinafter described, together with other features of the invention.

Figure 5:
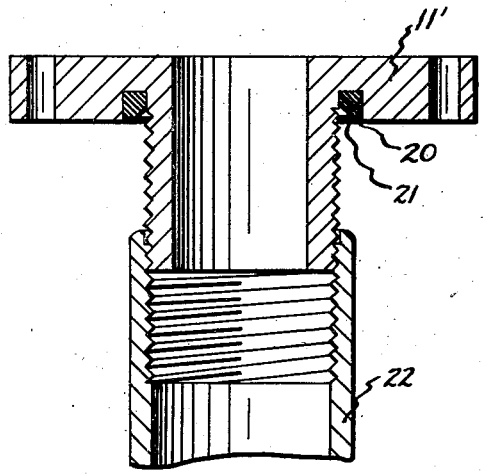
Figure 6:
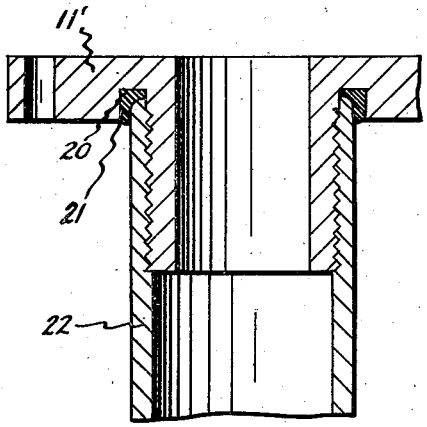
Figure 7:
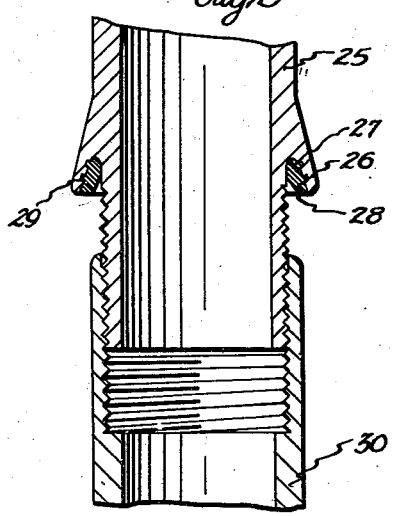
Figure 8:
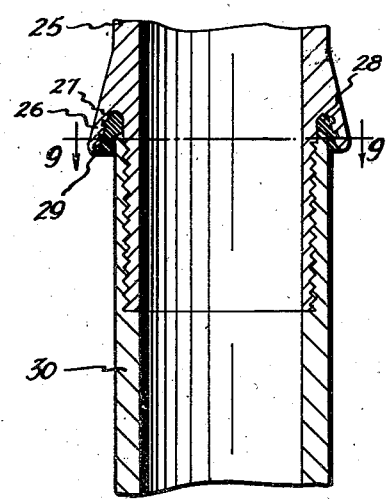
Figure 9:
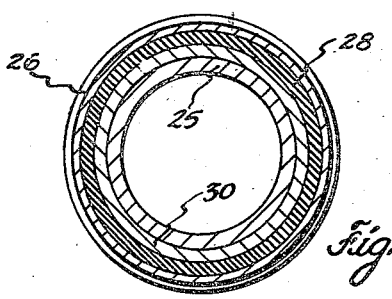

The invention will be more readily understood from a reading of the following specification and by reference to the accompanying drawings, in which an example of the invention is shown, and wherein:

Figure 1 is a transverse vertical sectional view of a joint seal constructed in accordance with the invention applied to a pair of connected members, Figure 2 is a horizontal cross-sectional view taken on the line 2—2 of Figure 1, Figure 3 is a reduced view similar to Figure 1 showing the packing material before a seal has been effected, Figure 4 is a view similar to Figure 1 showing a slightly modified form of the invention, Figure 5 is a view similar to Figure 3 showing another form of the invention, Figure 6 is a similar view showing the seal effected, Figure 7 is a view similar to Figure 3 showing the invention applied to another type of connected members, Figure 8 is a similar view showing the seal completed, and Figure 9 is a horizontal cross-sectional view taken on the line 9—9 of Figure 8.

In the drawings, the numeral 10 designates a nipple having an external annular flange 11 formed integral with its upper end. The nipple 10 is provided with external screw threads 12 extending substantially throughout its length and terminating short of the under side of the flange. A depending annular skirt 13 is formed on the under side of the flange 11 and surrounds the nipple 10, being spaced from said nipple, whereby an annular recess 14 is formed therebetween. The inner surface of the skirt is inclined outwardly towards its lower end whereby the recess has substantially a triangular shape in cross-section. A ring of packing or sealing material 16 is mounted within the recess 14 and has its inner surface inclined substantially parallel to the inclined surface of the skirt, whereby an annular recess 17 is formed between the packing material and the nipple. The packing material in this form is preferably made of lead or other metal softer than the metal of the nipple, and is retained within the recess 14 by a plurality of annular grooves 15 formed in the inclined inner surface of the skirt. It is noted that the lower end of the skirt 13 and the packing material 16 extend beyond the inner end of the screw-threaded portion 12 of the nipple.

An internally screw-threaded pipe 18, or other member to be connected to the nipple, has its end provided with several turns of coarse external screw threads 19. When the pipe is screwed on to the nipple the upper end of the pipe enters the recess 17 and engages the packing material 16 therein. As the joint is made up the coarse external screw threads 19 cut into the packing material and thereby firmly engage said packing to form a positive seal. Further, as the pipe end enters the recess the packing material is tightly compressed between said pipe and the skirt 13, thus increasing the sealing action of the packing material. Manifestly, some of the packing material will be forced from the recess 14 as the pipe enters, however, the material engaged within the grooves 15 in the skirt acts to retain the packing material within the recess, preventing complete displacement therefrom. It is pointed out that when the joint is completely made up the end of the pipe is spaced from the bottom of the recess since the screw threads 12 on the nipple are terminated short of the bottom of said recess. Such an arrangement also aids in preventing complete displacement of the packing material from the recess.

It is particularly noted that the compressing and distorting of the packing material into sealing position is accomplished by the pipe end moving into the recess 14 as the joint is made up. Obviously, due to such compressing and distorting action upon the packing material between the skirt and the end of the pipe as the joint is made up, a tight seal is formed therebetween. In addition the skirt acts as a bracing or reinforcing means to make a stronger connection, having in effect the properties of a bracing collar.

As is well known, joints formed between members screw-threaded together have a tendency to leak past the threads due to wear caused by frequent coupling and uncoupling of the members. Manifestly, the provision of a seal of the character described prevents such leakage, since the packing material is compressed between the end of the pipe and the bottom of the recess thereby closing off the space between the contiguous surfaces of the members. The fact that the packing material is compressed between the end of the pipe and the bottom of the recess also prevents fluid pressure within the pipe from blowing the packing material out of the recess.

A slightly modified form of the invention is shown in Figure 4 wherein the pipe, or other member to be connected to the nipple, is void of external screw threads, whereby a simple compressing and distorting connection between the pipe end and the packing material is had.

In Figures 5 and 6 another form of the invention is shown wherein the skirt is eliminated and an annular recess 20 provided in the under side of the flange 11' and surrounding the nipple. As the pipe 22 is screwed on to the nipple its upper end enters the recess and engages the packing material 21 therein to form a tight seal. The packing material in this form is preferably made of hard rubber, or other plastic material, molded or otherwise secured within the recess. Annular grooves similar to the grooves 15 may be provided in the recess 20 if desired but are not absolutely essential.

In Figures 7 to 9, the invention is shown applied to a joint between other types of members to be connected. On the end of a pipe 25 having its end externally screw-threaded, an annular skirt 26 is formed surrounding the inner end of the screw-threaded portion of the pipe similarly to the skirt 13 on the nipple 10. A recess 27 formed between the skirt and the pipe end is filled with packing material 28 and annular grooves 29 similar to the grooves 15 are provided within the recess, but may be omitted if desired. An internally screw-threaded pipe length 30 is screwed on to the pipe 25 and when the joint is made up a positive seal is formed between the end of the pipe and the recess 27 in the manner already described.

In each form the screw threads on the male section of the joint terminate at a point short of the bottom of the packing recess, whereby the end of the other member is spaced from the bottom of said recess when the joint is made up. Due to this arrangement the packing material within the recess is maintained under pressure at all times between the end of said member and the bottom of the recess.

It is noted that when the members have been uncoupled and a new joint is to be made up it is only necessary to replace the packing material within the recess provided therefor and to couple the members whereupon a positive seal is formed as in the manner previously described. It is possible, however, that the packing material need not be replaced for several coupling operations, particularly when rubber packing material is used as in the form shown in Figures 5 and 6, when members are used having coarse external screw threads for engaging the packing material similar to the screw threads 19 of the form first described, since such screw threads tend to engage the packing material tightly at all times.

Obviously a simple means of positively sealing a joint between two screw-threaded members is provided wherein the sealing or packing is performed by the wedging and compressing action of the pipe ends upon the packing material within the recess provided therefor. Also, the action of the skirt as a bracing or re-inforcing member to make a strong joint is manifest.

While the seal has been shown as applied to members having a screw-threaded connection, it is possible that such a seal could be applied to telescoping members arranged to be connected together in another manner.

What I claim and desire to secure by Letters Patent is:

1. A joint seal for telescoping members including, a member having an externally screw-threaded tubular extension and provided with an annular recess surrounding the base portion of said externally screw-threaded extension, a deformable packing element confined in the recess of said member and free from the threads of said externally screw-threaded extension but otherwise engaging the recess walls, and an internally screw-threaded tubular member receiving the externally screw-threaded extension of said first mentioned member and having its end portion proportioned relatively to said annular recess, and the contained packing element, whereby to enter the recess and engage with its end and outer side faces the packing element and deform the latter to seal the joint, the telescoping members being free to move longitudinally while being screwed together and unscrewed from each other.

2. A coupling seal for tubular members including, a tubular member having internal screw threads at one end, a member having an externally screw-threaded tubular extension for screwing into said first mentioned member and provided with an annular open recess from within which the extension projects, and an annular deformable packing element confined in said recess, said packing element having an annular recess between it and said screw-threaded extension for receiving the end portion of said first mentioned tubular member, but otherwise fitted tightly in the recess, said packing element, recess of the member in which it is contained, and the received end portion of the telescoping member, being so proportioned that said end portion of the one member entering the annular recess of the other member deforms the packing element within the recess whereby to seal the joint and the telescoping members are free to move longitudinally while being screwed together and unscrewed from each other.

3. A coupling seal for tubular members including, a tubular member having internal screw threads at one end, a member having an externally screw-threaded tubular extension for screwing into said first mentioned member and provided with an annular open recess from within which the extension projects, the annular outer wall of said recess being flared and provided with annular grooves therein, and an annular deformable packing element confined in said recess, said packing element being tapered inside and out, the outer peripheral face of the packing element corresponding in inclination to the flared wall of the recess and provided with annular raised portions located in the annular wall grooves of the recess, the inner face of said packing element defining a flared recess between the packing element and said externally screw-threaded extension of said second mentioned member to receive the end portion of the first mentioned member, the recess of the one member, packing element therein, and the entering end portion of the other member being so proportioned that the packing element is deformed within the member recess by said entering end portion whereby to seal the joint when the telescoping members are screwed together and said members are free to longitudinal movement while being screwed together and unscrewed from each other.

4. A joint seal for telescoping members including, a member having an externally screw-threaded element and provided with an annular recess at the inner end of said element, a deformable packing element confined in the recess of said member and free from the external threads at the outer end of said tubular element, and a tubular member having internal screw threads at one end receiving the externally screw-threaded tubular element of the first mentioned member, the end portion of said second mentioned member being proportioned relative to the annular recess of the other member and the packing element whereby to enter said recess and deform the packing element therein to seal the joint, the telescoping members being free to move longitudinally while being screwed together and unscrewed from each other.

LAURENCE L. RECTOR.